United States Patent
Hieber (10) Patent No.: US 12,439,890 B2
(45) Date of Patent: Oct. 14, 2025

(54) TOUCH CONTROLLED, LOW-LATENCY, LASER PET TOY

(71) Applicant: Aaron M. Hieber, Tipp City, OH (US)

(72) Inventor: Aaron M. Hieber, Tipp City, OH (US)

(*) Notice: Subject to any disclaimer, the term of this patent is extended or adjusted under 35 U.S.C. 154(b) by 65 days.

(21) Appl. No.: 18/502,024

(22) Filed: Nov. 5, 2023

(65) Prior Publication Data
US 2025/0072395 A1    Mar. 6, 2025

Related U.S. Application Data (63) Continuation-in-part of application No. 29/911,613, filed on Sep. 6, 2023.

(51) Int. Cl.
*A01K 15/02* (2006.01)
*H04N 7/18* (2006.01)

(52) U.S. Cl.
CPC ............ *A01K 15/025* (2013.01); *H04N 7/183* (2013.01)

(58) Field of Classification Search
CPC ............................ A01K 15/025; H04N 7/183
See application file for complete search history.

(56) References Cited

U.S. PATENT DOCUMENTS

| | | | |
|---|---|---|---|
| 5,443,036 A * | 8/1995 | Amiss .................... | A01K 15/02 119/707 |
| 7,066,780 B2 * | 6/2006 | Jamison ............... | A01K 15/025 119/707 |
| 7,487,114 B2 * | 2/2009 | Florance ................ | G06Q 50/16 701/438 |
| 10,094,542 B2 * | 10/2018 | Chauvet ................ | F21V 23/003 |
| 10,827,595 B2 * | 11/2020 | Reiss ................... | H04L 12/2827 |
| D943,842 S * | 2/2022 | Wang ........................... | D30/160 |
| D955,666 S * | 6/2022 | Tu ............................... | D30/160 |
| D995,010 S * | 8/2023 | Zhang ........................ | D30/160 |
| D1,046,322 S * | 10/2024 | Zeng .......................... | D21/601 |
| D1,064,451 S * | 2/2025 | Li .............................. | D30/160 |
| 2008/0011243 A1 * | 1/2008 | Moulton .............. | A01K 15/021 119/707 |
| 2011/0221692 A1 * | 9/2011 | Seydoux ................ | A63H 30/04 345/173 |
| 2012/0298049 A1 * | 11/2012 | Cook .................... | A01K 15/025 119/707 |
| 2019/0037807 A1 * | 2/2019 | Sweetnam ........... | A01K 15/025 |
| 2019/0184513 A1 * | 6/2019 | Knorr ...................... | B23Q 7/00 |
| 2019/0343077 A1 * | 11/2019 | Boshears ............. | A01K 15/025 |
| 2023/0140441 A1 * | 5/2023 | Koivuharju ............... | F41G 3/02 235/404 |
| 2023/0381592 A1 * | 11/2023 | Ellzey ................ | A63B 71/0622 |
| 2024/0067370 A1 * | 2/2024 | Hamouz ................ | H04R 1/028 |

* cited by examiner

*Primary Examiner* — Michael B. Pierorazio
(74) *Attorney, Agent, or Firm* — R. William Graham

(57) ABSTRACT

A touch screen controlled light emitting pet toy that has a light emitting device equipped to direct a point of light on a surface to provide entertainment to a pet and includes movement about multiple axis and is operated by a touch screen computer based device communicably connected to a controller of the toy. The toy is equipped to receive user input from an application with a touch-screen directly or indirectly via a camera that provides live video data to the application and relays user input to the toy further allowingdikect control and pre-recorded pattern control of the light emitting device through low latency touch screen interactions.

8 Claims, 7 Drawing Sheets

TOUCH CONTROLLED, LOW-LATENCY, LASER PET TOY

FIELD OF INVENTION

The present inventive concepts generally relate to pet toys, and specifically, to pet toys constructed and adapted to direct a point of light on a distal surface to provide entertainment to the animal. More particularly, the disclosure relates to improvements in such pet toys and their control.

There are many varieties of pet toys. Many pet toys incorporate a bobble, dangle, or similar small item that is readily moved in an erratic fashion to attract and entertain the animal. Many such toys also incorporate a light, and may be capable of directing a small point of light at various objects to allow the animal to chase the spot of light. While the art is fairly crowded, there is in need of a pet toy that is capable of being remotely operated and accessed to entertain the pet.

BRIEF SUMMARY OF THE INVENTION

It is a desire of the present inventive concepts to improve pet toys.

Another desire to improve a device that projects a light on a surface which is remotely controlled.

A further desire is to enable a phone application remote controlled pet toy.

It is a further desire to enable remote control of a pet laser toy using a touch screen in order to direct the laser to a location based on touch.

A further aspect is to provide a pet toy with a wifi capability to be permit remote control.

According to an embodiment of the disclosure, a pet toy includes a light emitting device equipped to direct a point of light on a surface to provide entertainment to a pet and having movement about multiple axis, a controller operably connected to the light emitting device to control movement thereof and equipped with a communication module; a camera operably associated with the toy to provide live video data; and a touch screen controller communicably connected to the controller and receiving live video data from the camera and equipped with an application program which provides an application screen with touch screen movement for communicating signal data to control and actuate the light emitting device. The controller can be a low-cost, low-power system on a chip microcontrollers with integrated Wi-Fi and dual-mode Bluetooth, such as ESP32. A servo mounted motor can be operably connected to the light source, such as a laser, and connected to the microcontroller.

A hand held touch screen device, such as a touch screen phone, computer or tablet, for example, can be equipped with the application to permit a user to turn on the toy light as well as control a position of the light as well as its movement. The toy can be equipped with a WIFI or Bluetooth module to permit wireless connection, such as an Internet connection. A feature of the invention is resides in improving prior devices with a significant advancement in ultra low latency interaction and control through a remote device.

A camera with or without audio can be operably connected to the toy in a manner to permit the user to have a visual field of view about the toy from a remote location through the computer based device.

The laser or other light source can be contained within or mounted to the housing preferably to transmit through a transparent portion to permit the light to direct its light outward from the housing, and maintain the safety of components therein. The laser/light source can also be capable of pivotal movement with respect to the servo mounted motor, which in combination with rotational movement can provide the ability to direct the light object onto a surface anywhere within a predefined area.

One or more motors can be contained within the housing to drive the rotational and pivotal movements of the laser/light source through, for instance, geared interactions. A power source, either AC or DC battery (preferably rechargeable), may also be connected to components within the housing.

The circuitry can be configured to provide either a constant beam of light or an intermittent beam of light or controlled as defined by the application on the computer based device. Further optionally, the application can include configuring with an auto timed mechanism to deactivate the laser/light source after a predetermined period of operation.

The web based application controller may be operable through a wireless signal transmitter that communicates with a signal receiver contained within the housing. The remote control unit may be configured to control one or more operations of the pet toy, including, for instance, an on/off function of the laser/light source, operation of the motor(s) to control movement of the light source, and other operating features of the laser/light source (i.e., selection between a constant or intermittent light display). The invention provides an ability to draw patterns of light and/or set a speed/timer.

Various aspects, embodiments, and configurations of the inventive concepts are possible without departing from the principles disclosed herein. The inventive concepts are therefore not limited to any of the particular aspects, embodiments, or configurations described herein.

BRIEF DESCRIPTION OF DRAWINGS

The foregoing and additional objects, features, and advantages of the present inventive concepts will become more readily apparent from the following detailed description of preferred embodiments, made with reference to the accompanying drawings.

DETAILED DESCRIPTION OF PREFERRED EMBODIMENT

Figure 1:
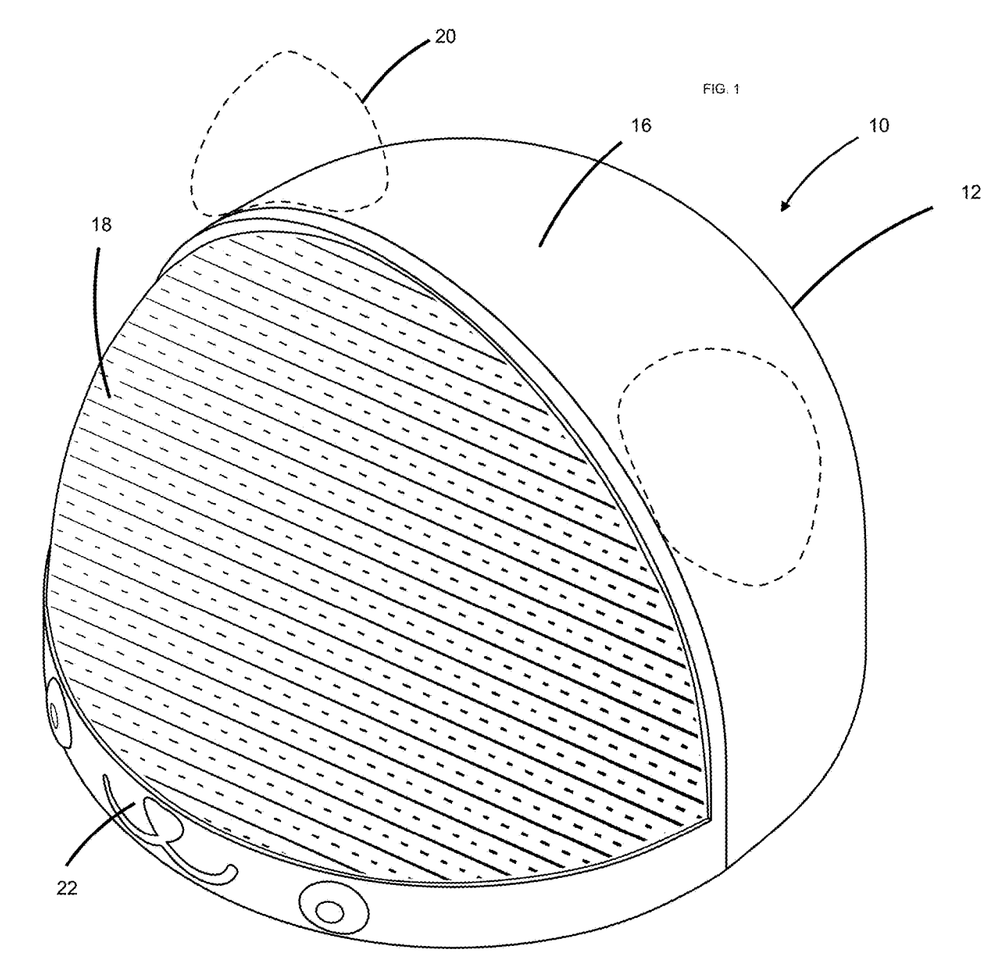
FIG. 1 is a perspective view of showing an embodiment of a Touch Controlled, Low-Latency, Laser Pet Toy.
Figure 2:
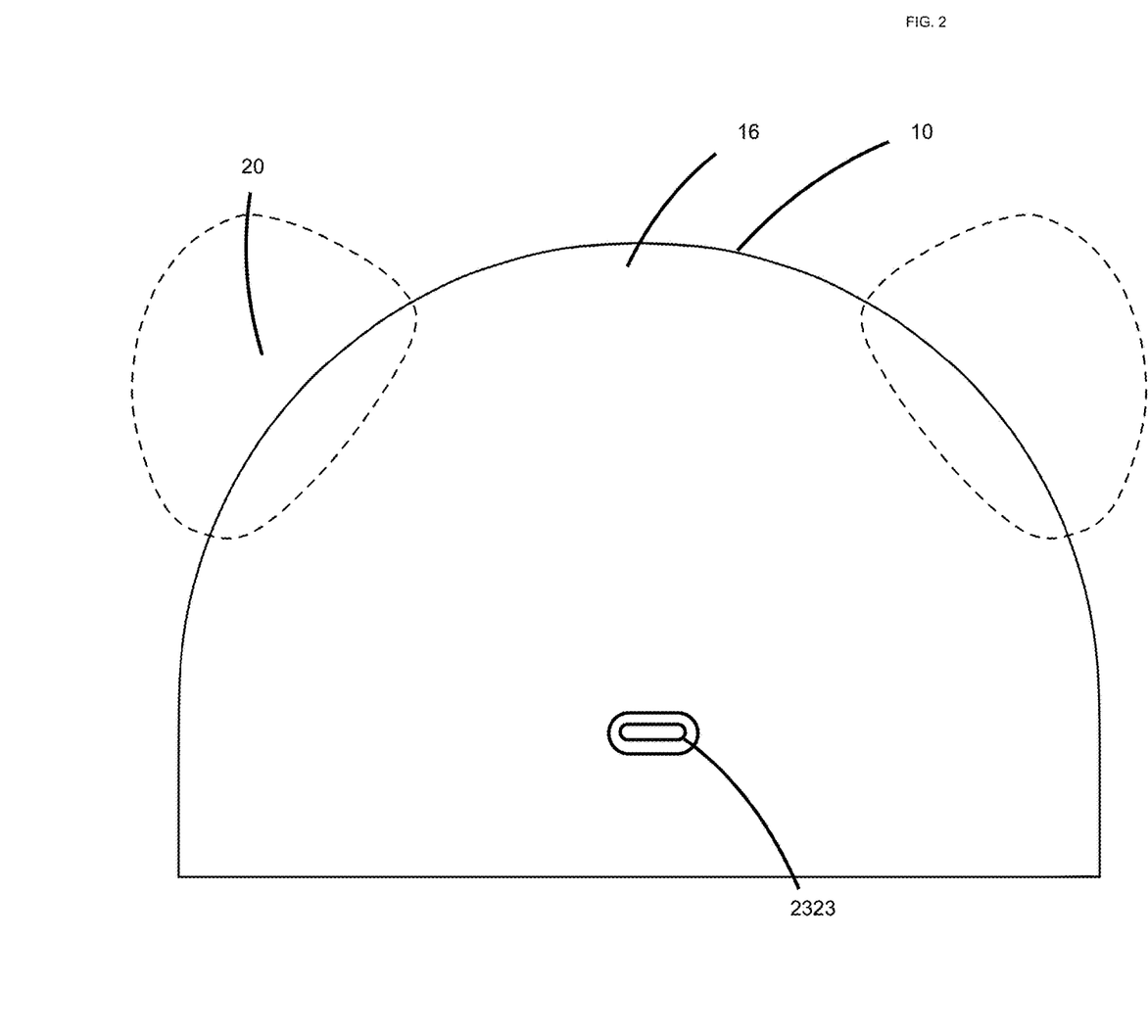
FIG. 2 is a back view of a Touch Controlled, Low-Latency, Laser Pet Toy of the embodiment in FIG. 1.
Figure 3:
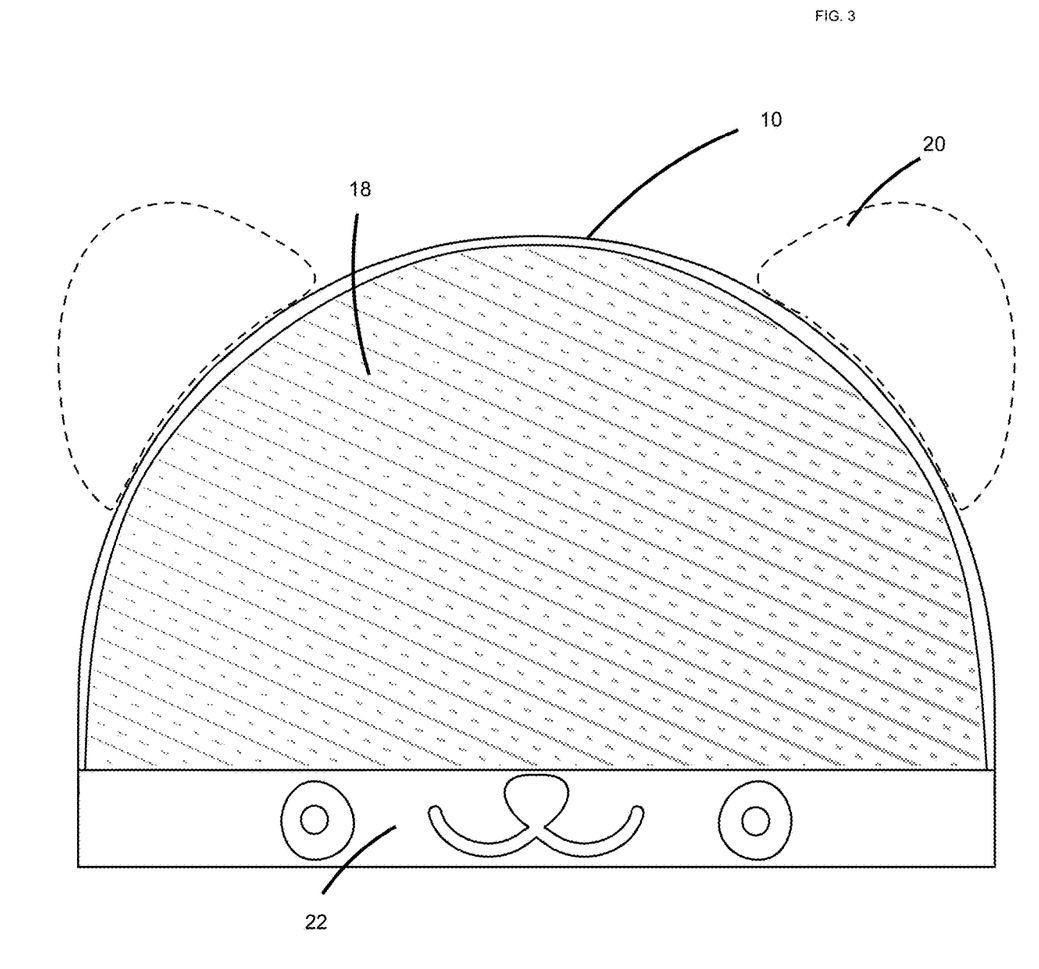
FIG. 3 is a front view of a Touch Controlled, Low-Latency, Laser Pet Toy of the embodiment in FIG. 1.
Figure 4:
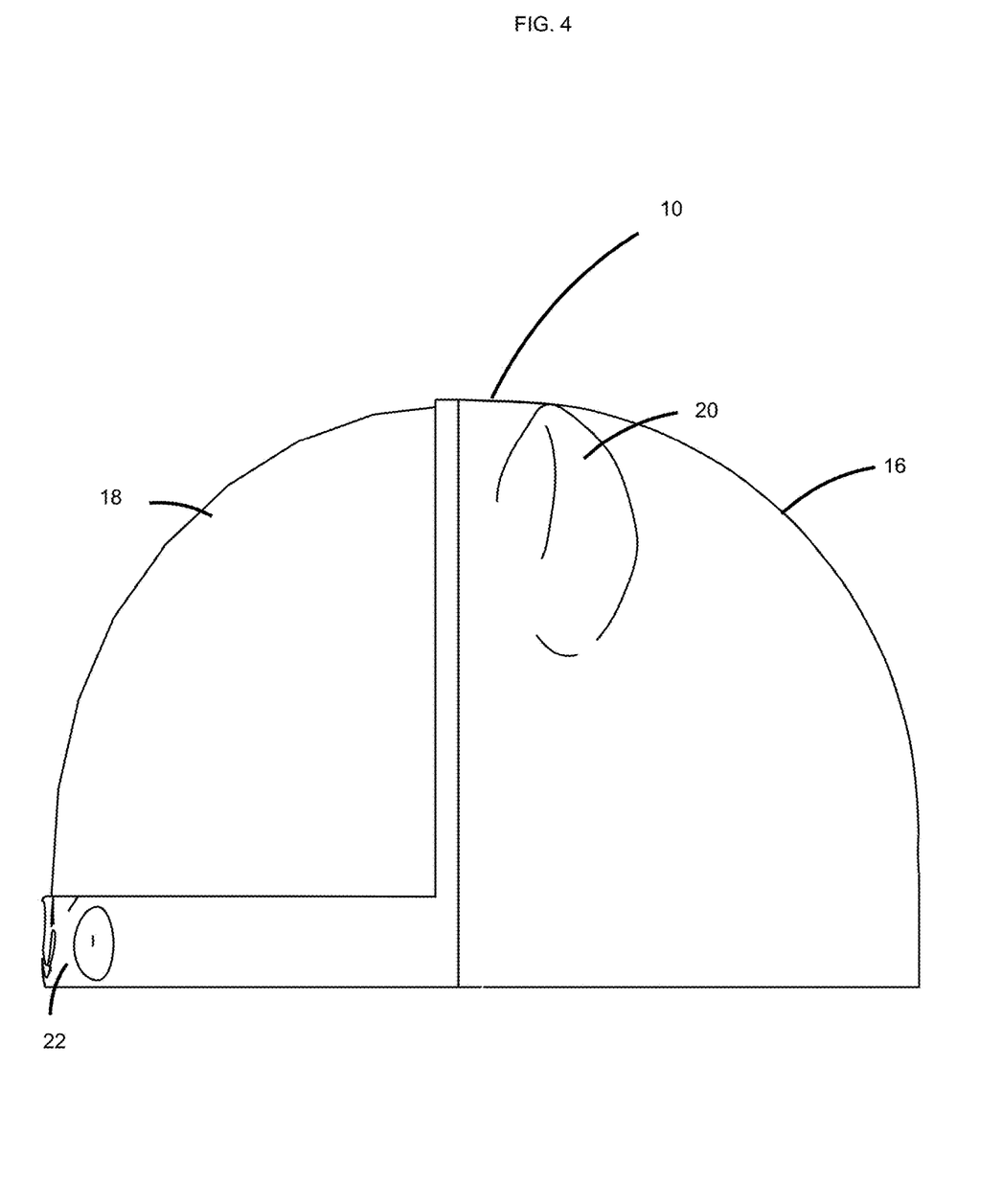
FIG. 4 is a right side view of an embodiment of the Touch Controlled, Low-Latency, Laser Pet Toy.
Figure 5:
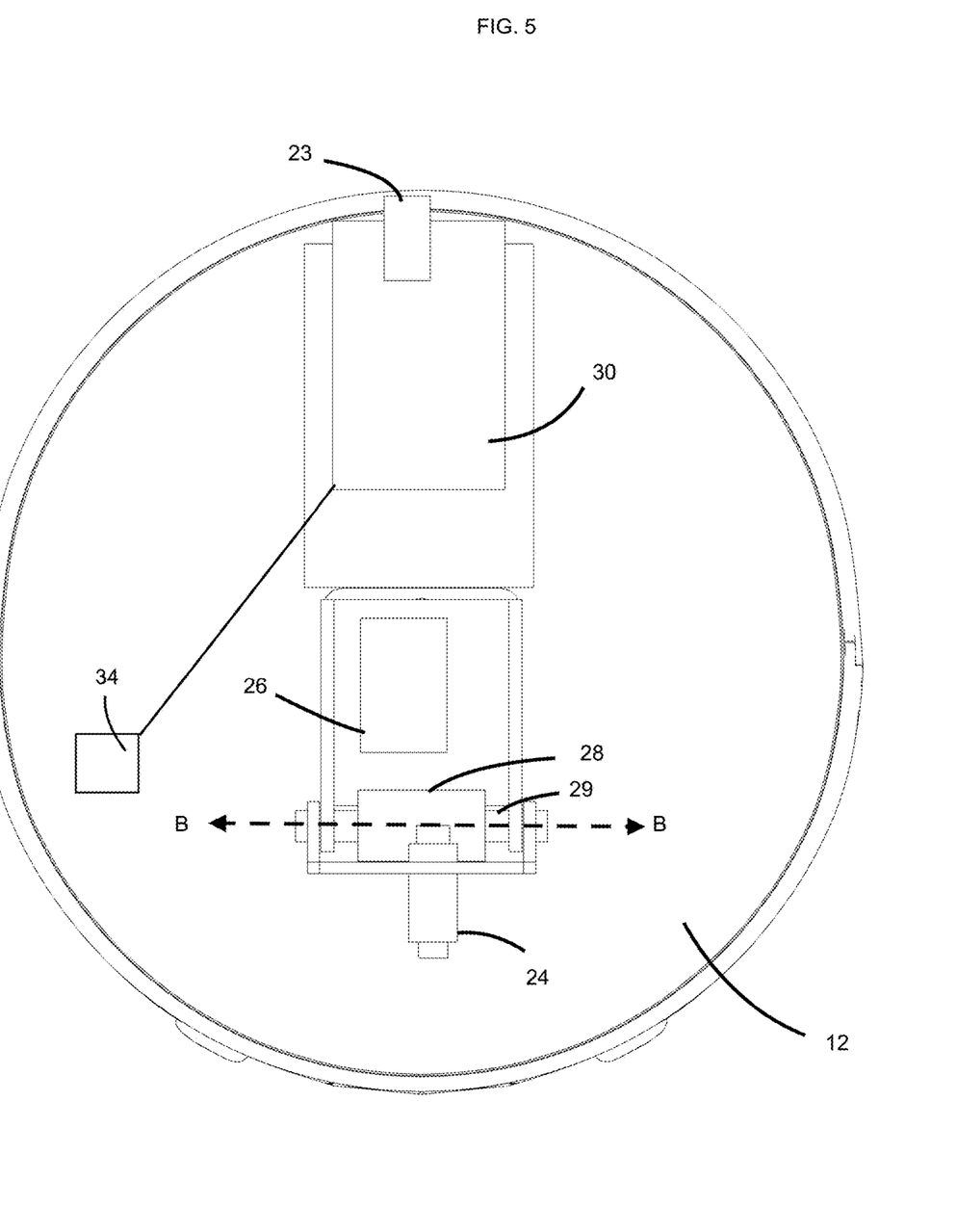
FIG. 5 is a top view revealing components within a housing of an embodiment of a Touch Controlled, Low-Latency, Laser Pet Toy.
Figure 6:
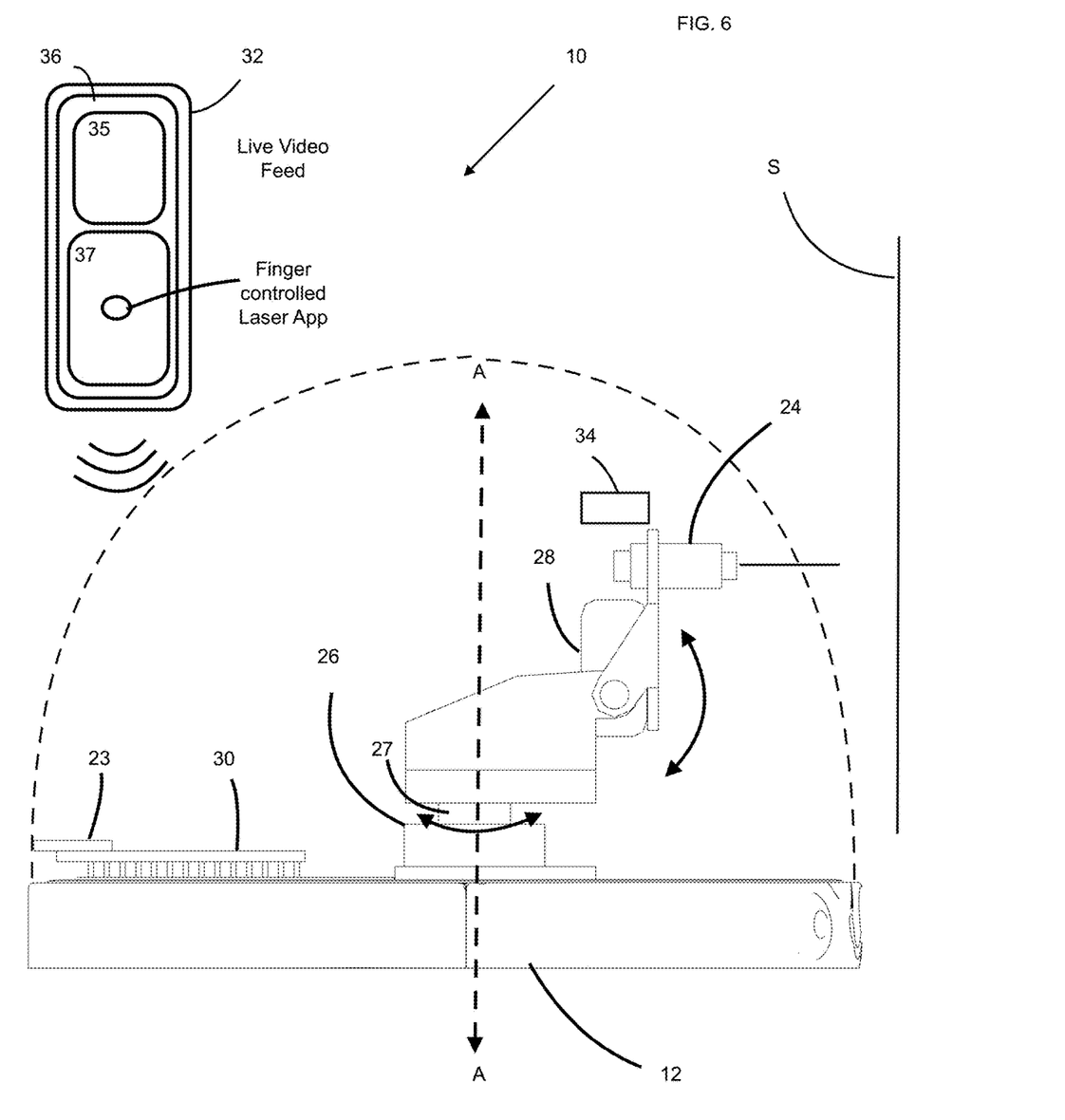
FIG. 6 is a schematic view of components within a Touch Controlled illustrating remote control operation.
Figure 7:
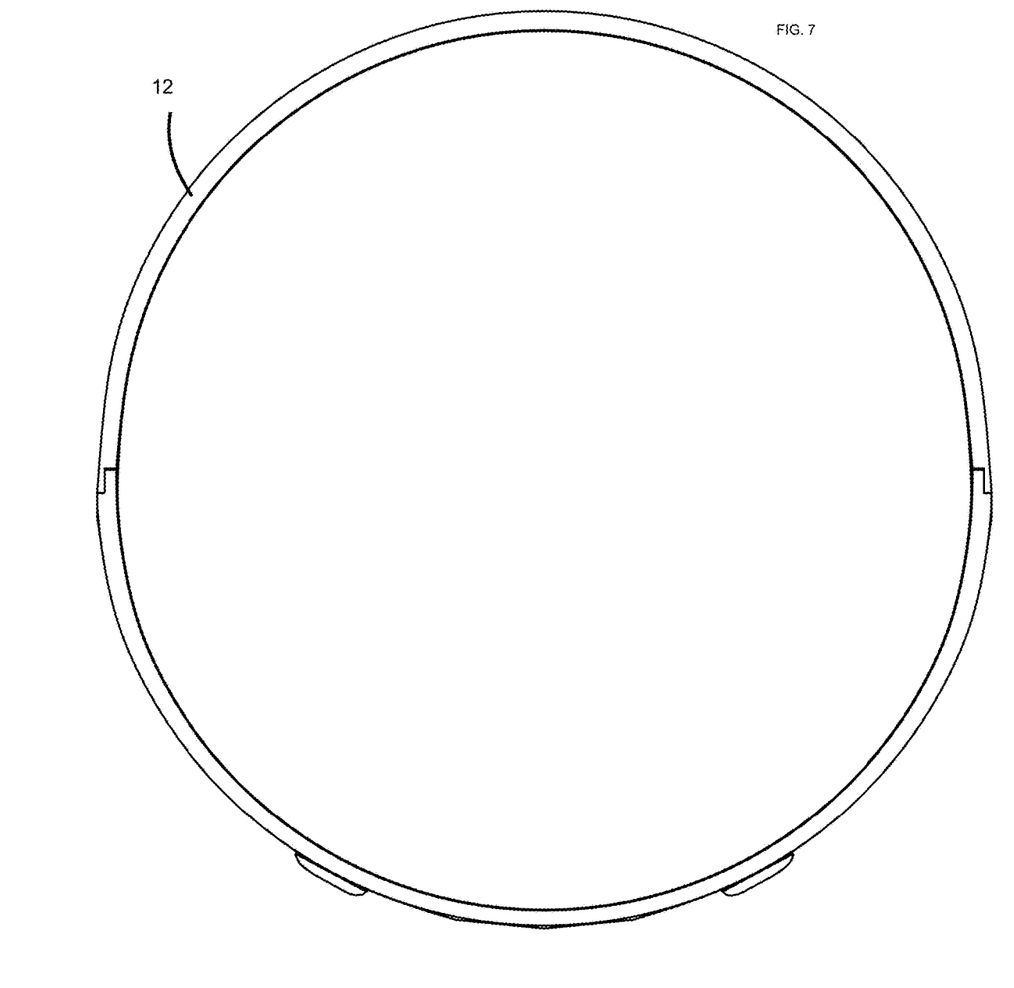
FIG. 7 depicts a bottom view of an embodiment of a Touch Controlled, Low-Latency, Laser Pet Toy of an embodiment of the invention.

Various features, benefits, and configurations of the present inventive concepts are shown in the accompanying drawings in illustrative embodiments. Additional features, benefits and configurations will be readily apparent to those of ordinary skill in the art based on this disclosure, and all such features, benefits and configurations are within the scope of the present inventive concepts. Various embodiments will now be described in detail with reference to the accompanying drawings.

Referring now to the drawings, a touch controlled, low-latency, laser pet toy is generally designated by the numeral 10 according to various principles of the present inventive concepts. The touch controlled, low-latency, laser pet toy 10 includes a housing 12, having a base 14, an upper dome 16 having at least a portion 18 of which is transparent to light. The dome 16 can be configured with external pet structural aesthetic features such as ears 20 and face 22. The back of dome 16 can include a power supply receptacle 23, e.g., charging port connection.

Operatively disposed on the base 14, is mounted a rotatable and multi-axis point movable light emitting device 24, such as a laser/light source according to a preferred aspect of the inventive concepts. A first servo motor 26 controls rotational movement of the laser 24 by movement about axis A-A, and a second servo motor 28 controls the vertical movement of the laser 24 by movement about axis B-B. Each of the servo motors 26 and 28 have gearing mechanisms 27 and 29 which enable controlled movement. In this regard, the toy 10 enables controlled patterns of light with manual and automatic functionality in terms of time and pattern of light emitted. The particular invention provides significant improvement over the prior art in low latency, i.e., less than 20 ms seconds in response to a signal instruction.

A controller 30 is electrically connected to the light emitting device 24, servo motors 28 and 30 and charging port 23. The controller 30 can be a low-cost, low-power system on a chip microcontrollers with integrated Wi-Fi and dual-mode Bluetooth, such as ESP32. Here, one or more motors are contemplated as contained within the housing 12 drive the rotational and pivotal movements of the light emitting device 24 through, for instance, geared interactions. A power source, either AC or DC battery (preferably rechargeable), can be connected to components within the housing 12.

A touch screen device 32 can be operably associated or connected to the controller 30 for actuating the light emitting device 24 in a manner to cause light to be directed on a surface S. The device 32 can be a hand held touch screen device, such as a touch screen phone, computer or tablet, for example, can be equipped with an application to permit a user to turn on the light emitting device 24 as well as control a position of the light emitting device 24 as well as its movement. The microcontroller 30 can be equipped with an a WIFI or Bluetooth module to permit wireless connection, such as an Internet connection.

A camera 34 with or without audio can be operably connected to the microcontroller 30 in a manner to permit the user to have a visual field of view about the toy 10 from a remote location through the computer based device 32. It is contemplated the camera 34 can be internally or externally associated or remote to the housing 12. The application can provide a visual display of the environment captured through live feed of the camera 34 on a portion 35 of screen 36 and a portion 37 of screen 36 permits touch screen movement of the light emitting device 24 in correlation to the finger position on the portion 37.

The laser 24 can be contained within or mounted to the housing 12. As seen in the embodiment, the laser 24 is within the housing 12 and portion 18 of dome is transparent to permit the light therethrough. Additionally, the housing 12 maintains the safety of components therein. The toy 10 is capable of the ability to direct the light object onto surface S anywhere within a predefined area.

The circuitry can be configured to provide either a constant beam of light or an intermittent beam of light or controlled as defined by the application on the computer based device. Further optionally, the application can include configuring with an auto timed mechanism to deactivate the laser/light source after a predetermined period of operation.

The web based application controller may be operable through a wireless signal transmitter that communicates with a signal receiver contained within the housing. The remote control unit may be configured to control one or more operations of the pet toy, including, for instance, an on/off function of the laser/light source, operation of the motor(s) to control movement of the light source, and other operating features of the laser/light source (i.e., selection between a constant or intermittent light display).

The laser/light emitting device 24 illustrated can be a 4 mW, 650 nm laser operating at 3 VDC@25 mA. However, any appropriate light source (for example, a light emitting diode, laser diode, or other light source) capable of projecting a point of light on a distal surface may be used without deviating from the scope of the present inventive concepts.

The present inventive concepts have been described with reference to a preferred embodiment thereof. It should be readily apparent to those skilled in the art, however, that many changes, variations, modifications, and other uses and applications to the disclosed device are possible, and all such changes, variations, modifications, and other uses and applications which do not depart from the spirit and scope of the inventive concepts disclosed herein should be deemed to be covered by the following claims.

The invention claimed is:

1. A touch screen controlled light emitting pet toy comprising:
   a housing;
   a light emitting device operable to project a light beam on a surface to provide entertainment to a pet and equipped for movement about multiple axis with respect to said housing;
   a camera operably associated with the housing and operable to provide a live video feed of an environment surrounding the housing;
   a touch screen controller communicably connected to the camera and the light emitting device, said controller comprising a display for displaying the live video feed and a user interface allowing directional control of the light beam based on user input;
   a remote application program configured to allow user control of the light beam in real-time low-latency operation using said display and touch screen inputs.

2. The touch screen controlled light emitting pet toy of claim 1, which provides servo motor control having low latency components to move said light emitting device.

3. The touch screen controlled light emitting pet toy of claim 1, wherein said a housing which includes said light emitting device.

4. The touch screen controlled light emitting pet toy of claim 3, which includes a power supply receptacle in said housing and operably connected to said light emitting device.

5. The touch screen controlled light emitting pet toy of claim 1, wherein said touch screen controller is configured to control operation of said light emitting device based upon automated program instructions which provide a predetermined pattern.

6. The pet toy of claim 1, wherein the electronic circuit is operable to cause said light emitting device to emit one of a constant beam of light and an intermittent beam of light during operation.

7. The pet toy of claim 5, wherein said automated program instructions include operating said toy for a predetermined time period.

8. The pet toy of claim 5, wherein said automated light emitting device instructions include operating said pet toy under a controlled speed and light pattern.

* * * * *